United States Patent
Xie (10) Patent No.: US 11,057,113 B1
(45) Date of Patent: Jul. 6, 2021

(54) HIGH-SPEED SILICON PHOTONICS OPTICAL TRANSCEIVERS

(71) Applicant: Alibaba Group Holding Limited, Grand Cayman (KY)

(72) Inventor: Chongjin Xie, Morganville, NJ (US)

(73) Assignee: Alibaba Group Holding Limited, George Town (KY)

( * ) Notice: Subject to any disclaimer, the term of this patent is extended or adjusted under 35 U.S.C. 154(b) by 0 days.

(21) Appl. No.: 16/890,900

(22) Filed: Jun. 2, 2020

(51) Int. Cl.
| | |
|---|---|
| *H04B 10/00* | (2013.01) |
| *H04B 10/40* | (2013.01) |
| *H04B 10/60* | (2013.01) |
| *H04B 10/50* | (2013.01) |
| *H04J 14/00* | (2006.01) |

(52) U.S. Cl.
CPC ............ *H04B 10/40* (2013.01); *H04B 10/50* (2013.01); *H04B 10/60* (2013.01)

(58) Field of Classification Search
CPC ........ H04B 10/40; H04B 10/43; H04B 10/50; H04B 10/501; H04B 10/503; H04B 10/504; H04B 10/505
See application file for complete search history.

(56) References Cited

U.S. PATENT DOCUMENTS

| | | |
|---|---|---|
| 5,305,412 A | 4/1994 | Paoli |
| 6,016,219 A | 1/2000 | Fatehi |
| 6,175,560 B1 | 1/2001 | Bhagalia et al. |
| 6,266,168 B1 | 7/2001 | Denkin |
| 6,341,032 B1 | 1/2002 | Fukashiro |
| 6,433,922 B1 | 8/2002 | Ghera |
| 6,650,468 B1 | 11/2003 | Bryant |
| 6,754,420 B2 | 6/2004 | Tsuritani |
| 6,952,395 B1 | 10/2005 | Manoharan |
| 7,024,110 B2 | 4/2006 | Jasti |
| 7,123,404 B1 | 10/2006 | Mori |
| 7,136,583 B2 | 11/2006 | Oberg |
| 7,231,146 B2 | 6/2007 | Arecco |
| 7,400,829 B2 | 7/2008 | Watanabe |
| 7,756,422 B2 | 7/2010 | Sakamoto |
| 8,822,895 B2 | 9/2014 | Abedin |
| 9,712,239 B2 | 7/2017 | Murshid |
| 9,787,418 B2 | 10/2017 | Earl |
| 9,917,672 B2 | 3/2018 | Jensen |
| 10,230,464 B2 | 3/2019 | Yuan |
| 2001/0021045 A1 | 9/2001 | Tervonen |
| 2002/0154353 A1 | 10/2002 | Heath |
| 2002/0191904 A1 | 12/2002 | Kani |
| 2004/0037555 A1 | 2/2004 | Evangelides |
| 2004/0090662 A1 | 5/2004 | Bang |
| 2004/0114925 A1 | 6/2004 | Berthold |
| 2004/0146305 A1 | 7/2004 | Neubelt |

(Continued)

*Primary Examiner* — Daniel G Dobson
(74) *Attorney, Agent, or Firm* — Shun Yao; Park, Vaughan, Fleming & Dowler, LLP (57) ABSTRACT

One embodiment can provide an optical transceiver based on silicon photonics. The optical transceiver can include an optical transmitter and an optical receiver. The optical transmitter or the optical receiver can include one or more semiconductor optical amplifiers (SOAs) configured to amplify optical signals to be transmitted by the optical transmitter or optical signals received by the optical receiver, respectively, thereby facilitating the optical transceiver to meet an optical power budget requirement of a high-speed optical link.

20 Claims, 7 Drawing Sheets

(56) References Cited

U.S. PATENT DOCUMENTS

| | | | |
|---|---|---|---|
| 2004/0175187 A1 | 9/2004 | Eiselt | |
| 2004/0208506 A1 | 10/2004 | Kinoshita | |
| 2004/0213577 A1 | 10/2004 | Sugahara | |
| 2005/0025486 A1 | 2/2005 | Zhong | |
| 2005/0047781 A1 | 3/2005 | El-Reedy | |
| 2005/0074236 A1 | 4/2005 | Urimindi | |
| 2005/0110980 A1 | 5/2005 | Maehara | |
| 2006/0087975 A1 | 4/2006 | Zheng | |
| 2006/0115266 A1 | 6/2006 | Levi | |
| 2006/0176545 A1 | 8/2006 | Nakamura | |
| 2008/0095541 A1* | 4/2008 | Dallesasse | H04B 10/40 398/191 |
| 2008/0138088 A1* | 6/2008 | Welch | H01S 5/026 398/183 |
| 2009/0028562 A1 | 1/2009 | Gianordoli | |
| 2009/0067843 A1 | 3/2009 | Way | |
| 2009/0103915 A1 | 4/2009 | Aprile | |
| 2009/0226174 A1 | 9/2009 | Csupor | |
| 2009/0245786 A1 | 10/2009 | Sakamoto | |
| 2009/0262790 A1 | 10/2009 | Molotchko | |
| 2009/0290837 A1 | 11/2009 | Chen | |
| 2010/0091355 A1 | 4/2010 | Ota | |
| 2010/0284687 A1 | 11/2010 | Tanzi | |
| 2010/0290780 A1 | 11/2010 | Teipen | |
| 2010/0296808 A1 | 11/2010 | Hinderthuer | |
| 2011/0116786 A1 | 5/2011 | Wellbrock | |
| 2011/0126005 A1 | 5/2011 | Carpenter | |
| 2011/0274435 A1 | 11/2011 | Fini | |
| 2012/0020672 A1 | 1/2012 | Aguren | |
| 2012/0033966 A1 | 2/2012 | Rosenbluth | |
| 2012/0106971 A1 | 5/2012 | Sugaya | |
| 2012/0281950 A1 | 11/2012 | Fattal | |
| 2012/0294604 A1 | 11/2012 | Roberts | |
| 2013/0189856 A1 | 7/2013 | Ko | |
| 2013/0223484 A1 | 8/2013 | Tang | |
| 2013/0236175 A1 | 9/2013 | Sethumadhavan | |
| 2013/0243438 A1 | 9/2013 | Tang | |
| 2013/0272694 A1 | 10/2013 | Sandstrom | |
| 2013/0343757 A1 | 12/2013 | Wigley | |
| 2014/0013402 A1 | 1/2014 | Bugenhagen | |
| 2014/0029941 A1 | 1/2014 | Bratkovski | |
| 2014/0105592 A1 | 4/2014 | Kataria | |
| 2014/0153922 A1 | 6/2014 | Ryf | |
| 2014/0186021 A1 | 7/2014 | Striegler | |
| 2014/0199065 A1 | 7/2014 | Bratkovski | |
| 2014/0205286 A1 | 7/2014 | Ji | |
| 2014/0248059 A1 | 9/2014 | Tang | |
| 2014/0258772 A1 | 9/2014 | Kataria | |
| 2014/0286648 A1 | 9/2014 | Buelow | |
| 2014/0307304 A1 | 10/2014 | Zhu | |
| 2014/0363171 A1 | 12/2014 | Tang | |
| 2015/0249501 A1 | 9/2015 | Nagarajan | |
| 2015/0296279 A1 | 10/2015 | Bouda | |
| 2015/0341123 A1 | 11/2015 | Nagarajan | |
| 2016/0056889 A1 | 2/2016 | Le Taillandier de Gabory | |
| 2016/0233959 A1 | 8/2016 | Murshid | |
| 2016/0277101 A1 | 9/2016 | Jiang | |
| 2016/0306115 A1 | 10/2016 | Koonen | |
| 2017/0155466 A1 | 6/2017 | Zhou | |
| 2017/0214463 A1 | 7/2017 | Milione | |
| 2017/0299900 A1 | 10/2017 | Montoya | |
| 2017/0353242 A1 | 12/2017 | Mansouri Rad | |
| 2017/0353265 A1 | 12/2017 | Mansouri Rad | |
| 2020/0252133 A1* | 8/2020 | Hong | H01S 5/02248 |

* cited by examiner

HIGH-SPEED SILICON PHOTONICS OPTICAL TRANSCEIVERS

BACKGROUND

Field

The present application relates to high-speed optical transceivers. More specifically, the present application relates to high-speed optical transceivers constructed based on silicon photonics technologies.

Related Art

In datacenters, a massive number of servers are connected together via datacenter networks such that they work in concert to provide computing and storage power for Internet services and cloud computing. Since the beginning of this century, the increasing demand of the Internet and cloud computing services has caused datacenter traffic to double every one or two years, presenting a big challenge to datacenter networks. To meet the demand of such fast traffic growth, the speed of datacenter networks has evolved quickly. It has been shown that the speed of the servers and switch ports are projected to reach 100 Gbps and 400 Gbps in 2020, and 400 Gbps and 1.6 terabit per second (Tbps) in 2025, respectively.

In today's high-speed, large-capacity datacenters, optical interconnect has replaced copper cables in almost every connection outside of servers, providing high-bandwidth channels between the connected network devices (e.g., between a server and an edge switch, or between a router and a core switch). The implementation of the optical interconnect makes optical transceivers essential in datacenters. More specifically, at the interface between an electrical switch and the optical interconnect, optical transceivers are used to convert the outgoing electrical signals from the electrical domain to the optical domain and the incoming optical signals from the optical domain to the electrical domain. Optical transceivers operating at the speed of 100 Gbps have been deployed in today's datacenters, and 400 Gbps optical transceivers are being developed. Faster (e.g., 800 Gbps, 1.6 Tbps, and beyond) optical transceivers will soon be needed in datacenters.

SUMMARY

One embodiment can provide an optical transmitter based on silicon photonics. The transmitter can include a plurality of optical channels and one or more semiconductor optical amplifiers (SOAs) coupled to the optical channels. A respective SOA is configured to amplify to-be-transmitted optical signals from one or more optical channels.

In a variation on this embodiment, the plurality of optical channels can include a number of wavelength channels.

In a further variation, the transmitter can further include a wavelength multiplexer configured to combine optical signals from the plurality of wavelength channels. The wavelength multiplexer can be configured to send the combined optical signals to an SOA for amplification, thereby facilitating the optical transmitter to meet an optical power budget requirement of a high-speed optical link.

In a further variation, the SOA is a built-in SOA, and the wavelength multiplexer and the built-in SOA can be integrated onto a same semiconductor substrate, forming an active multiplexer.

In a variation on this embodiment, the plurality of optical channels can include a number of spatial channels.

In a further variation, a respective spatial channel can include a modulator configured to modulate a continuous wave optical signal and to send the modulated optical signal to an SOA for amplification, thereby facilitating the optical transmitter to meet an optical power budget requirement of a high-speed optical link.

In a further variation, the SOA is a built-in SOA, and the modulator and the built-in SOA can be packaged together to form a system-in-a-package (SiP).

In a variation on this embodiment, the optical transmitter can include at least four optical channels with each optical channel operating at a data rate of at least 200 Gbps.

In a variation on this embodiment, the optical transmitter can be part of an optical transceiver that conforms to a standard form factor.

In a variation on this embodiment, each optical channel can include a plurality of electrical and optical components, and one or more electrical and optical components can be integrated onto a Si-based substrate using a silicon photonics technology.

One embodiment can provide an optical receiver based on silicon photonics. The optical receiver can include a plurality of optical channels and one or more semiconductor optical amplifiers (SOAs) coupled to the optical channels. A respective SOA is configured to amplify optical signals received by one or more optical channels.

One embodiment can provide an optical transceiver based on silicon photonics. The optical transceiver can include an optical transmitter and an optical receiver. The optical transmitter or the optical receiver can include one or more semiconductor optical amplifiers (SOAs) configured to amplify optical signals to be transmitted by the optical transmitter or optical signals received by the optical receiver, respectively, thereby facilitating the optical transceiver to meet an optical power budget requirement of a high-speed optical link.

BRIEF DESCRIPTION OF THE FIGURES

In the figures, like reference numerals refer to the same figure elements.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview

Embodiments of the present invention provide compact, high-power, low-cost silicon photonics optical transceivers that can operate at a speed beyond 800 Gbps. To increase the optical power budget, the silicon photonics optical transceiver can include a built-in semiconductor optical amplifier (SOA). More specifically, the SOA can be integrated with other components within the transceiver to reduce size and enhance reliability. In some embodiments, the photonics silicon optical transceiver can include an active multiplexer or a low-loss or even lossless modulator. The active multiplexer can be achieved by integrating an SOA with an optical multiplexer onto a single photonic integrated circuit (PIC) chip. On the other hand, the low-loss or lossless modulator can be a system-in-a-package (SiP) that combines the SOA and the modulator.

High-Speed Optical Transceivers

Silicon photonics technology uses crystalline semiconductor wafers as the platform for the integration of active and passive photonic circuits along with electronic components on a single microchip. Silicon photonics devices can be made using mature Si semiconductor fabrication techniques, which make low-cost, large-scale manufacturing possible. Moreover, the ability to integrate multiple optical and electronic components onto a single microchip also makes it possible to produce compact devices. However, there is a significant drawback for silicon photonics transceivers to meet the requirements of the high-speed datacenter network. More specifically, due to their relatively high loss, silicon photonics transceivers often cannot meet the optical power budget requirement of the high-speed datacenter network.

To meet the optical power budget requirement, optical amplification is needed. Erbium-doped fiber amplifiers (EDFAs) are common amplifiers used by fiber optics communication systems to boost optical power during transmission. However, due to their bulky size and high cost, EDFAs are commonly used for long-distance fiber communication systems and are not suitable for datacenter uses, where space is limited and costs can skyrocket giving the large number of devices. In some embodiments, semiconductor optical amplifiers (SOAs) can be used by the transceivers to meet the optical power budget requirement, either by increasing the output power of the transmitter or by increasing the sensitivity of the receiver.

Figure 1:
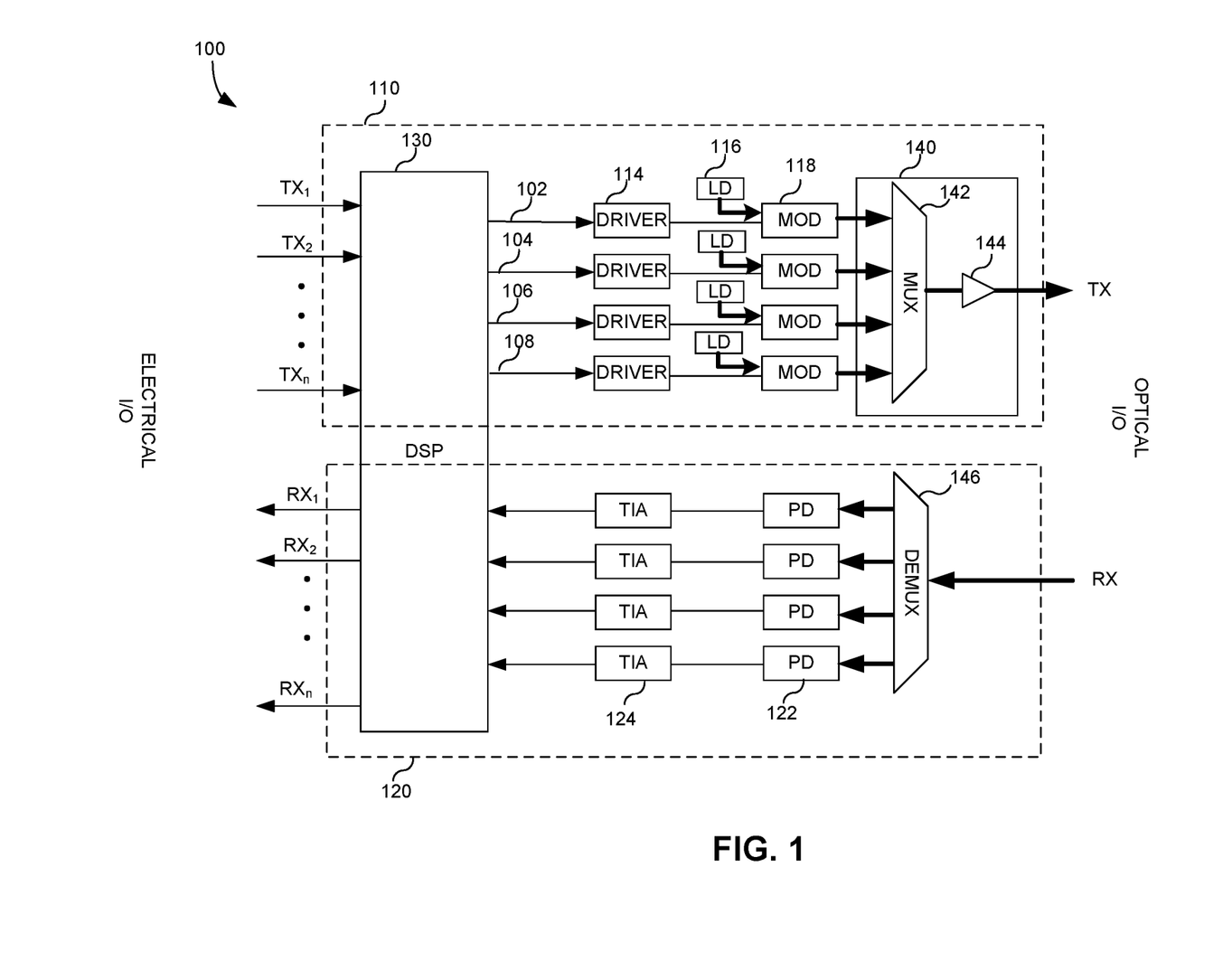
FIG. 1 shows a schematic of an exemplary far-reach four wavelength (FR4) high-speed optical transceiver, according to one embodiment.

FIG. 1 shows a schematic of an exemplary FR4 high-speed optical transceiver, according to one embodiment. High-speed optical transceiver 100 can include a transmitter 110 and a receiver 120. Transmitter 110 and receiver 120 can share a digital signal processor (DSP) 130, which can be used to provide various digital processing functionalities that can provide rate conversion, such as converting 8×100 Gbps signals to 4×200 Gbps signals and reverse conversion, and improve the performance of optical transceivers, such as equalization, pre-emphasis for the signals coming from and sending to host sides, clock and data recovery (CDR), and equalization functions to compensate for signal distortions induced by drivers, modulators, photo detectors (PDs), and trans-impedance amplifiers (TIAs).

The left side of optical transceiver 100 shown in FIG. 1 is the electrical interface, where multiple electrical channels can be coupled to DSP 130. In some embodiments, transmitter 110 and receiver 120 can each interface with eight electrical channels, with each channel running at a speed of 100 Gbps. Alternatively, transmitter 110 and receiver 120 can each interface with four electrical channels, with each channel running at a speed of 200 Gbps. This can result in transceiver 100 operating at a speed of 800 Gbps.

In the example shown in FIG. 1, optical transceiver 100 includes four wavelength channels, such as transmitting channels 102, 104, 106, and 108. Each wavelength channel can operate at a speed of 200 Gbps. In some embodiments, the four wavelength channels can include coarse wavelength-division multiplexing (CWDM) channels with a channel space of 20 nm. For example, the center wavelengths of the four wavelength channels can include 1271 nm, 1291 nm, 1311 nm, and 1331 nm. In the drawings, to distinguish between electrical signals and optical signals, the optical signals are drawn using thicker lines.

In transmitter 110, each wavelength channel can include a modulator driver (e.g., driver 114), a laser module (e.g., a continuous wave (CW) laser diode (LD) 116), and a modulator (e.g., modulator 118). The driver, the CW laser, and the modulator together convert the electrical signal to modulated optical signals. In the example shown in FIG. 1, external modulators are used, because, compared to directly modulated lasers (DMLs), external modulators can provide a larger bandwidth and can achieve a higher extinction ratio. The modulator can be an electro-absorption modulator, a Mach-Zehnder modulator, or a ring modulator.

To reduce the size and manufacturing cost of the optical transceiver, silicon photonics technology can be used. For example, silicon photonics modulators, which can be much smaller in size compared to conventional modulators, can be used in transmitter 110. Moreover, silicon phonics technology can also be used to integrate a number of electrical and optical components onto a single semiconductor chip (e.g., a Si-based chip). For example, it is possible to integrate the electrical components (e.g., the drivers) and the optical components (the CW lasers and the modulators) onto a single Si-based chip, thus significantly reducing the size of the transmitter. Similarly, components on the receiver can also be made or integrated using silicon photonics technology. In addition, the transmitter and receiver components can be integrated onto a single silicon chip to further reduce the size and simplify the optical transceiver. One drawback of silicon photonics chip is its high insertion loss, including fiber coupling loss and silicon waveguide loss. Typically, high power CW lasers are required for silicon photonics transceivers. To achieve a certain bit rate, the required optical power at the receiver is linearly proportional to the bit rate, i.e., a higher bit rate requires a higher optical power at the receiver. When operating at such a high data rate (e.g., 200 Gbps or higher), the optical power budget needs to increase to get sufficient optical power at the receiver. In some embodiments, the optical power budget can be increased by increasing the output power of transmitter 110. More specifically, transmitter 110 can include an active multiplexer 140, which includes a multiplexer 142 and an SOA 144.

Multiplexer 142 can be a CWDM multiplexer that can combine optical signals from the four wavelength channels (e.g., wavelength channels with center wavelengths of 1271 nm, 1291 nm, 1311 nm, and 1331 nm) onto a single fiber.

Moreover, before the output of multiplexer 142 is sent to the output fiber of transmitter 110, it is sent to SOA 144 for amplification. In some embodiments, power amplification between 3 and 10 dB can be achieved by SOA 144. Compared to the widely used EDFAs, SOAs are much more compact in size and can be integrated onto the same photonic chip (e.g., a Si- or InP-based optical chip). In the example shown in FIG. 1, multiplexer 142 and SOA 144 can be integrated onto a same photonic chip to form what is referred to as an active multiplexer. The word "active" refers to the fact that the integrated chip can provide gain to the input optical signal.

FIG. 1 also shows that, in the receiving direction, a demultiplexer 146 (which can be a CWDM demultiplexer) separates the received optical signal into four wavelength channels. Each wavelength channel can include a photo detector (PD) module (e.g., PD 122) for converting the received optical signals to electrical signals, and a trans-impedance amplifier (TIA) module (e.g., TIA 124) for amplification. Like transmitter 110, receiver 120 can be made using silicon photonics technology, with multiple optical and electrical components (e.g., the TIAs and the PDs) integrated onto a single chip.

In some embodiments, the wavelength channels in both transmitter portion 110 and receiver portion 120 of transceiver 100 can be CWDM channels, meaning that they have a channel spacing of at least 20 nm. This large channel spacing makes it possible to use low-cost un-cooled lasers as light sources, thus significantly reducing the overall cost of the datacenter network. For example, LD module 116 can include a low-cost laser operating without temperature control, and may have a wavelength tolerance of ±6 nm.

Integrating SOA 144 and multiplexer 142 onto the same chip makes it possible to achieve a silicon photonics optical transceiver (e.g., transceiver 100) that can meet the optical power budget for high-speed (800 Gbps or higher) operation and can conform to a standard form factor, such as small form-factor pluggable (SFP), SFP+, quad small form-factor pluggable (QSFP), QSFP double density (QSFP-DD), octal small form-factor pluggable (OSFP), XENPAK, etc. These transceivers with the standard form factors can be compatible with many existing switches or routers in datacenters.

Figure 2:
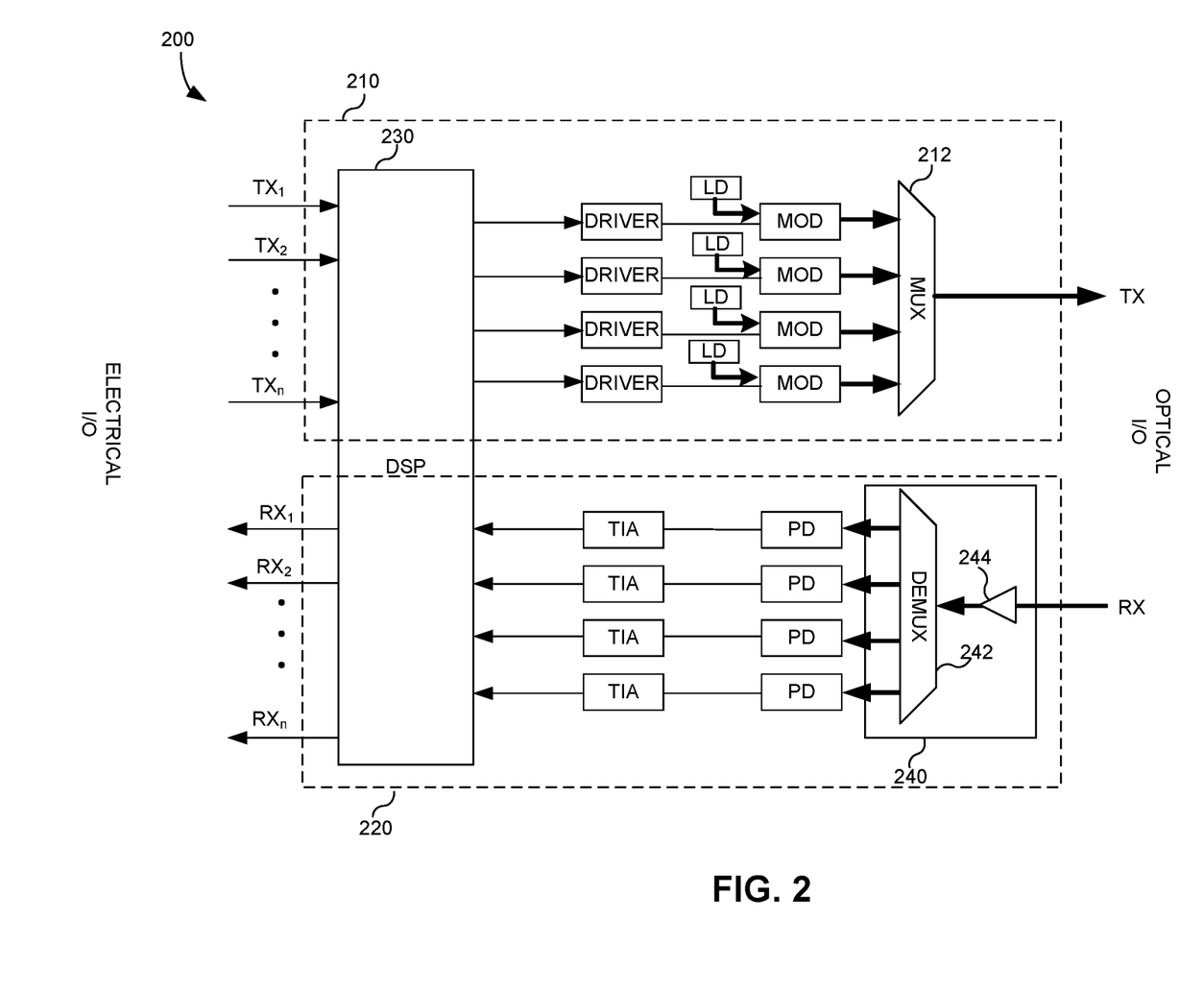
FIG. 2 shows a schematic of an alternative exemplary FR4 high-speed optical transceiver, according to one embodiment.

In addition to increasing the output power of the transmitter, one can also meet the optical power budget requirement by increasing the input power of the receiver. FIG. 2 shows a schematic of an alternative exemplary FR4 high-speed optical transceiver, according to one embodiment. Similar to transceiver 100, transceiver 200 can be built using silicon photonics technology and can include a transmitter 210, a receiver 220, and a DSP 230 shared by transmitter 210 and receiver 220. Moreover, like transceiver 100, transceiver 200 can include four optical channels, which can be CWDM channels with 20 nm channel spacing.

However, transmitter 210 is different from transmitter 110, because transmitter 210 only includes a passive multiplexer 212. Other components, such as the laser, the modulator drivers, and the modulators, within transmitter 210 can be similar to those in transmitter 110, and can be integrated onto a single chip using silicon photonics technology. Receiver 220 is different from receiver 120. More specifically, receiver 220 can include an active demultiplexer 240, which can include a demultiplexer 242 and an SOA 244. Similar to active multiplexer 140 shown in FIG. 1, active demultiplexer 240 can be an integrated photonic chip, with demultiplexer 242 and SOA 244 integrated onto the same substrate. Integrating SOA 244 onto the same photonic chip with demultiplexer 242 not only decreases the overall size of the device but also reduces loss. Moreover, because the received signals are amplified by SOA 244 before being sent to the photo detectors, the optical power requirements on the received signals can be relaxed, meaning that the corresponding transmitter from the other end of the transmission link can transmit at a lower power (e.g., there is no need to include the active multiplexer in the transmitter).

The other components within receiver 220, such as the PDs and the TIAs can be integrated onto a same substrate (e.g., a Si-based substrate) using silicon photonics technology. Similarly, various components within transmitter 210 (e.g., the lasers, the drivers, and the modulators) can also be integrated onto a same Si-based substrate. Like transceiver 100, high-speed transceiver 200 can conform to a standard form factor, such as SFP, SFP+, QSFP, QSFP-DD, OSFP, XENPAK, etc.

In the examples shown in FIGS. 1 and 2, the FR4 transceivers are built to support the 800 Gbps far-reach (FR) link, which can provide connectivity for a distance up to 2 km or longer. A datacenter may require other types of links, such as datacenter reach (DR) links that can provide connectivity for a distance up to 500 m. Optical transceivers supporting the DR links can have a different design than those supporting the FR links. For example, the relatively short reach makes it possible to use a single wavelength but multiple fibers to achieve the data rate of 800 Gbps and beyond. For example, the 800 Gbps data can be divided into four spatial channels, with each spatial channel running at 200 Gbps; and the four spatial channels can be separately carried by four different fibers or by a multi-mode or multi-core fiber supporting four space-division multiplexing (SDM) channels.

Figure 3:
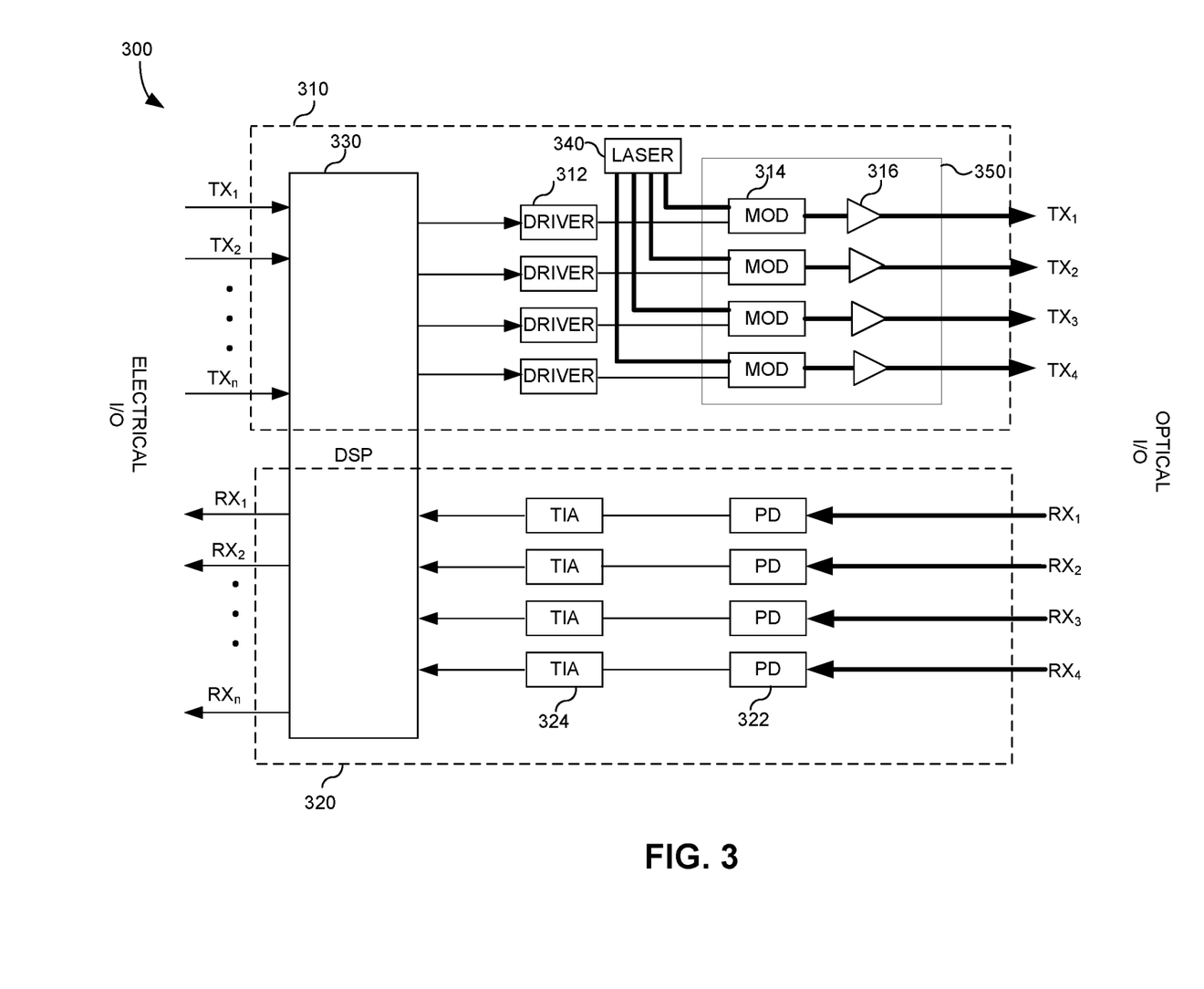
FIG. 3 shows a schematic of an exemplary datacenter-reach four lane (DR4) high-speed optical transceiver, according to one embodiment.

FIG. 3 shows a schematic of an exemplary high-speed DR4 optical transceiver supporting datacenter reach (DR) links, according to one embodiment. In FIG. 3, the electrical interface of transceiver 300 can be similar to the ones shown in FIGS. 1 and 2. FIG. 3 also shows that transceiver 300 includes a transmitter 310, a receiver 320, and a DSP 330 shared between transmitter 310 and receiver 320. Transmitter 310 and receiver 320 can each include four spatial channels, denoted as $TX_1$ to $TX_4$ and $RX_1$ to $RX_4$, respectively.

Each channel in transmitter 310 can include a laser (e.g., laser 340), a modulator driver (e.g., driver 312), and a modulator (e.g., modulator 314). Note that, because the four spatial channels use the same wavelength, they can share the laser. In the example shown in FIG. 3, laser 340 can be the light source for the four spatial channels. The wavelength of laser 340 can be selected based on the type of modulator or photo detectors used in the transceiver 300. In some embodiments, the wavelength of laser 340 can be any of the CWDM or dense wavelength-division multiplexing (DWDM) wavelengths.

To meet the optical power budget requirements, high-speed optical transceiver 300 can include, in each spatial channel, a built-in amplifier. More specifically, each spatial channel can include an SOA (e.g., SOA 316) capable of amplifying the modulated optical signal outputted by the modulator. For example, the output of modulator 314 can be sent to SOA 316 to increase the output power of the spatial channel $TX_1$. In some embodiments, the modulators in transmitter 310 can include silicon photonics modulators (e.g., Si-based ring modulators). Different types of modulators (e.g., conventional electro-optical modulators or Mach-Zehnder modulators) can also be possible. In addition to the modulators, other optical and electrical components within transceiver 300 (e.g., the laser and modulator drivers) can also be implemented using the silicon photonics technology. For example, the laser can be integrated onto the same chip with the modulator drivers.

In some embodiments, to increase the level of integration, thus decreasing the size and power loss, an SOA and a modulator can be packaged within a same package, forming a system-in-a-package (SiP). Such a SiP can be referred to as a low-loss or lossless modulator, because compared to conventional modulators that typically have high loss, the built-in SOA can compensate for the power loss of the modulator. In some embodiments, each spatial channel can have its own low-loss or lossless modulator SiP. Alternatively, multiple SOAs and multiple modulators can be packaged together to form a multi-channel low-loss or lossless modulator SiP. In the example shown in FIG. 3, the modulators and SOAs of the four spatial channels are packaged inside a multi-channel low-loss or lossless modulator SiP 350.

In the receiving direction, receiver 320 can also include four spatial channels, with each spatial channel including a photo detector (e.g., PD 322) and a TIA (e.g., TIA 324). Like transceiver 100 or 200, high-speed transceiver 300 can conform to a standard form factor, such as SFP, SFP+, QSFP, QSFP-DD, OSFP, XENPAK, etc.

Figure 4A:
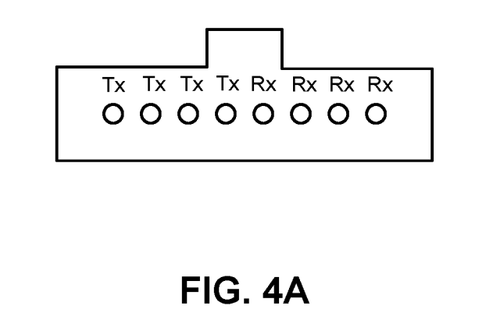
FIG. 4A shows the layout of an MPO-8 connector.
Figure 4B:
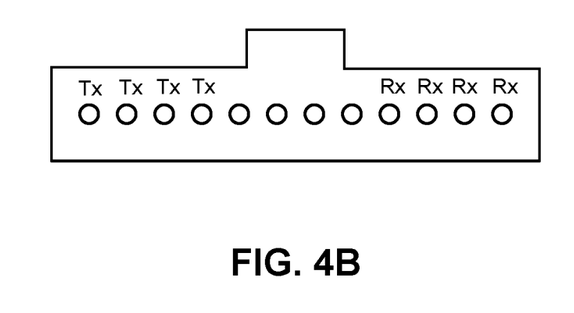
FIG. 4B shows the layout of an MPO-12 connector.

In some embodiments, four spatial channels of the transmitting and receiving direction can be coupled to four different fibers. To enable plug and play, the optical input/output (I/O) interface of transceiver 300 can also include a MPO (Multiple-Fiber Push-on/Pull-off) connector coupled to both the transmitting fibers and the receiving fibers. The MPO connector can couple transceiver 300 to an external multi-fiber optical cable, which can be an MPO trunk cable or a fan-out cable. The MPO trunk cable can include MPO connectors on either end of an eight- or twelve-fiber ribbon cable. The MPO fan-out cable can include an MPO connector on one end while the other end of the cable can have a variety of standard optical fiber interfaces, such as LC or SC connectors. In some embodiments, the MPO connector can include an eight-fiber connector (e.g., MPO-8) or a twelve-fiber connector (e.g., MPO-12). FIG. 4A shows the layout of an MPO-8 connector. FIG. 4B shows the layout of an MPO-12 connector.

Figure 5:
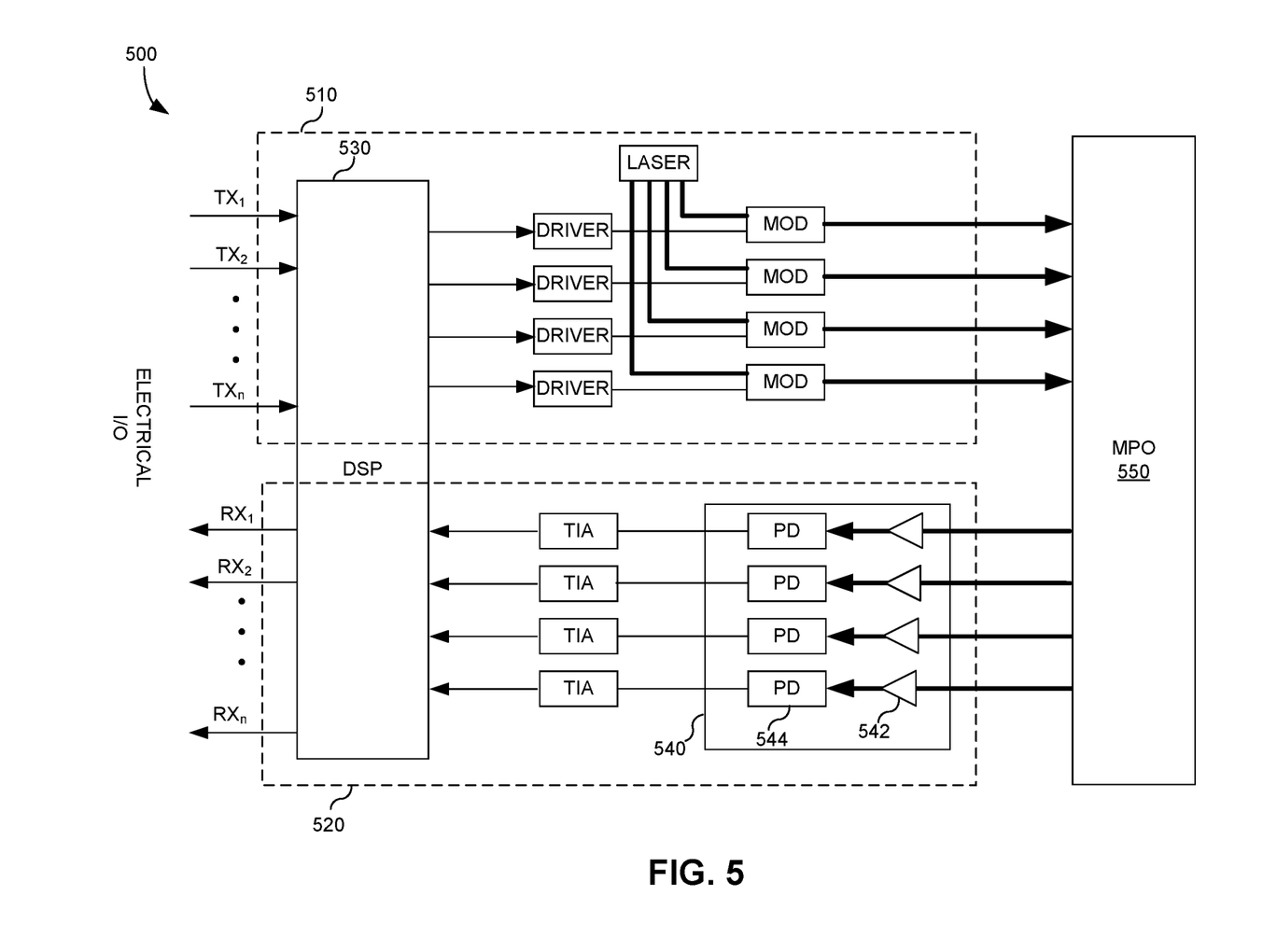
FIG. 5 shows a schematic of an exemplary DR4 high-speed optical transceiver, according to one embodiment.

FIG. 5 shows a schematic of an exemplary DR4 high-speed optical transceiver supporting datacenter reach (DR) links, according to one embodiment. In FIG. 5, high-speed optical transceiver 500 includes a transmitter 510, a receiver 520, and a DSP 530 shared between transmitter 510 and receiver 520. Transmitter 510 and receiver 520 can each include four spatial channels. In the transmitting direction, each spatial channel can include a laser, a modulator driver, and a modulator, with one or more of these components made using the silicon photonics technology. Like transmitter 310 shown in FIG. 3, the four spatial channels can share a same laser. However, unlike transmitter 310, transmitter 510 does not include any amplifiers.

To meet the optical power budget requirement of the high-speed DR link, in the example shown in FIG. 5, receiver 520 can include a number of SOAs that are respectively coupled to the PDs of the different spatial channels. More specifically, the received optical signals are first amplified by the SOAs before they are detected and converted to electrical signals by the PDs. Amplification before receiving makes it possible for the transmitter on the other end of the communication link to transmit at a lower power.

To reduce device size and increase efficiency, in some embodiments, an SOA can be integrated with a PD to form a PD module with enhanced sensitivity. To further decrease the size, the SOAs and PDs from multiple different spatial channels can be integrated onto the same photonic chip. In the example shown in FIG. 5, the SOAs (e.g., SOA 542) and PDs (e.g., PD 544) from all four spatial channels can be integrated onto a same photonic chip to form a high-sensitivity PD module 540. Depending on the operating wavelength, high-sensitivity PD module 540 can be fabricated on a Si- or InP-based substrate. In alternative embodiments, silicon phonics technology can be used to integrate the TIAs with the PDs and the SOAs to form a single chip.

FIG. 5 also shows that the outputs of transmitter 510 and the inputs of receiver 520 can be coupled to an MPO connector 550, which can be similar to the exemplary MPO shown in FIG. 4A or FIG. 4B. The implementation of the MPO interface allows high-speed transceiver 500 to conform to a standard form factor, such as SFP, SFP+, QSFP, QSFP-DD, OSFP, XENPAK, etc.

Figure 6:
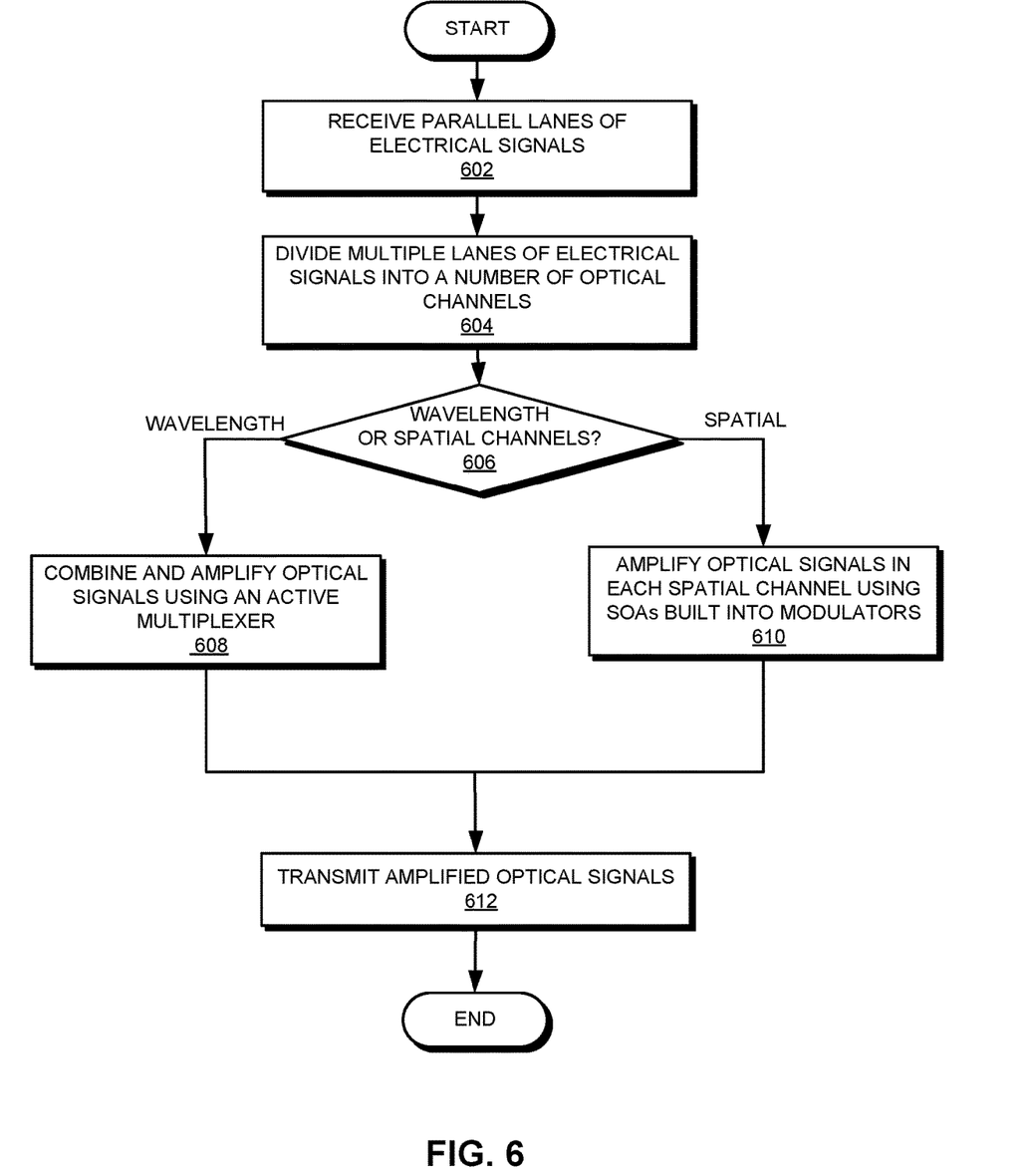
FIG. 6 presents a flow chart illustrating an exemplary process for transmitting data at a speed of at least 800 Gbps, according to one embodiment.

FIG. 6 presents a flow chart illustrating an exemplary process for transmitting data at a speed of at least 800 Gbps, according to one embodiment. During operation, a number (e.g., eight or more) of parallel lanes of electrical signals representing to-be-transmitted data can be received at the electrical interface of an optical transmitter (operation 602). Each of the parallel lanes of electrical signals can have a data rate of at least 100 Gbps. The multiple lanes of electrical signals can be divided into a number (e.g., four) of optical channels, which can be wavelength channels or spatial channels (operation 604). The system can determine if the optical channels are wavelength channels or spatial channels (operation 606). The wavelength channels can be used in far-reach links, whereas the spatial channels can be used in datacenter-reach links. If the optical channels are wavelength channels, optical signals from the different wavelength channels can be combined and amplified using an active multiplexer (operation 608). In some embodiments, the active multiplexer can include a wavelength multiplexer (e.g., a CWDM multiplexer) and a built-in SOA, which can be integrated with the multiplexer onto the same photonic chip. If the optical channels are spatial channels, optical signals of each spatial channel can be separately amplified by SOAs that are built into the respective modulators of the spatial channels (operation 610). In some embodiments, the SOAs and the modulators can be packaged inside the same package as a SiP. The amplified signals can then be transmitted by the transmitter over a standard optical interface (operation 612).

Note that, when the transmitter of an optical communication link is transmitting according to the operations shown in FIG. 6, no additional amplification will be needed on the receiver side. However, in some embodiments, it is possible for the transmitter to skip the signal amplification, thus resulting in the transmitted signal failing to meet the optical power budget requirement. To compensate for the insufficient optical power, in some embodiments, the receiver can perform the needed signal amplification.

Figure 7:
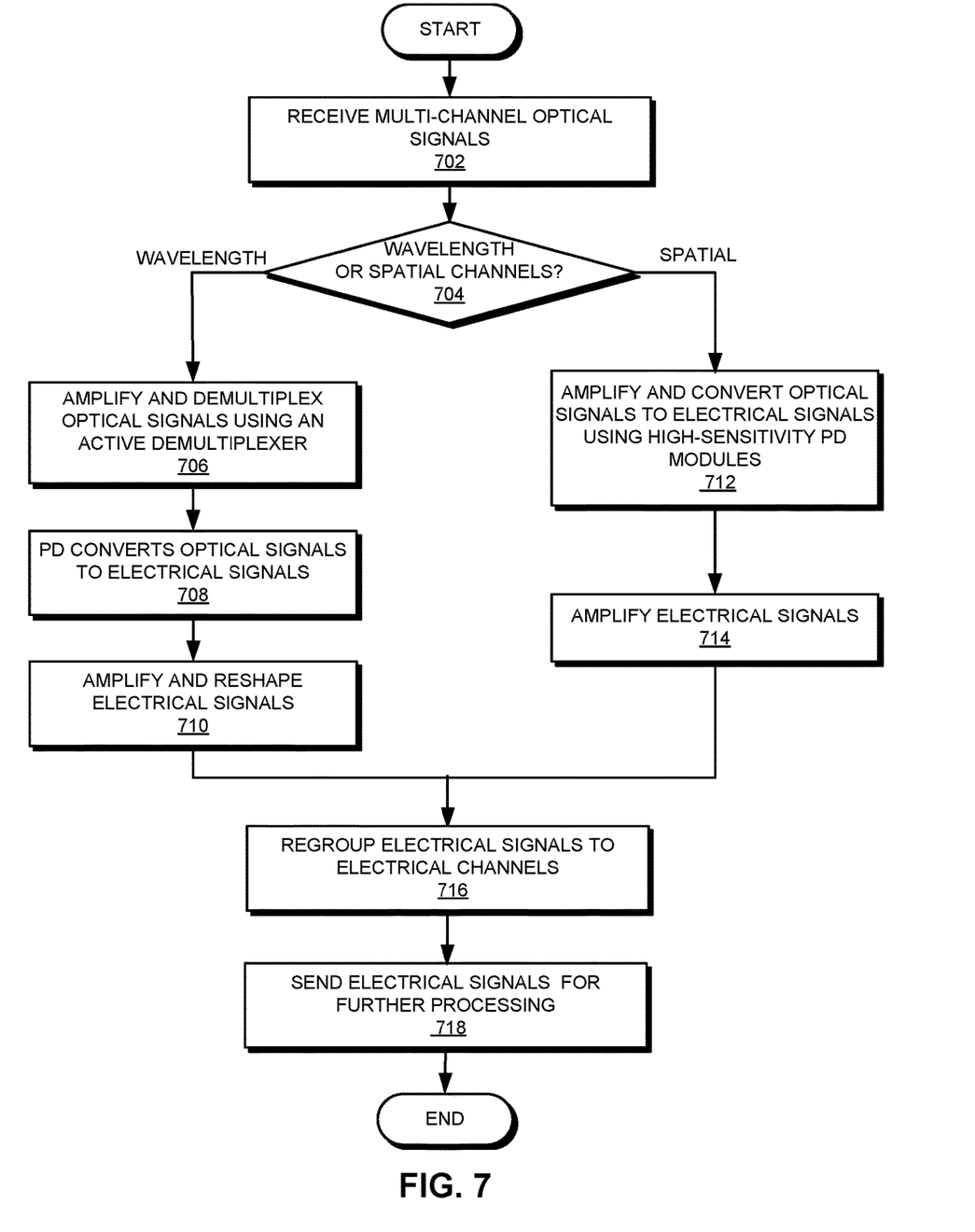
FIG. 7 presents a flow chart illustrating an exemplary process for receiving data at a speed of at least 800 Gbps, according to one embodiment.

FIG. 7 presents a flow chart illustrating an exemplary process for receiving data at a speed of at least 800 Gbps, according to one embodiment. During operation, a high-speed optical receiver receives optical signals of multiple (e.g., four) channels, with each channel carrying data at a speed of at least 200 Gbps (operation 702). The system determines whether the optical channels are wavelength channels or spatial channels (operation 704). The wavelength channels can be used in far-reach links, whereas the spatial channels can be used in datacenter-reach links. If the optical channels are wavelength channels, the received optical signals can be amplified and demultiplexed using an active wavelength demultiplexer (operation 706). A photo detector in each wavelength channel can then convert received optical signals to electrical signals (operation 708). The electrical signals can then be amplified and reshaped (operation 710). If the optical channels are spatial channels, the received optical signals in each spatial channel can be amplified and converted to electrical signals by a corresponding high-sensitivity PD module that integrates an SOA and a PD (operation 712). The electrical signals can then be amplified (operation 714). For both situations, the amplified electrical signals can be regrouped to a number of electrical channels (operation 716) and sent for further processing to extract data (operation 718).

In general, embodiments of the present invention provide a silicon photonics optical transceiver that can meet the optical power budget requirement of an optical link with a speed of 800 Gbps or higher. The high loss incurred by silicon photonics devices makes it challenging to meet the optical power budget requirement. In some embodiments, built-in SOAs can be introduced in the transmitter to increase the output power of a silicon photonics transmitter. For FR transceivers with multiple wavelength channels, an SOA can be integrated with the wavelength multiplexer to form an active multiplexer. For DR transceivers with multiple spatial channels, each transmitting spatial channel can include an SOA that is packaged together with the modulator for that channel to form a low-loss or lossless modulator. In alternative embodiments, built-in SOAs can be introduced in the receiver to increase the sensitivity of the receiver, thus relaxing the requirement on the output power of the silicon photonics transmitter. For FR transceivers with multiple wavelength channels, an SOA can be integrated with the wavelength demultiplexer to form an active demultiplexer. For DR transceivers with multiple spatial channels, each receiving spatial channel can include an SOA that is integrated with the PD for that channel to form a high-sensitivity PD module.

Note that in addition to the examples shown in FIGS. 1-3 and 5, the high-speed optical transceiver can have different configurations. For example, different integration levels can be achieved using the silicon photonics technology. Moreover, the number of optical and electrical channels or lanes can be more or fewer than what is shown in these figures, depending on the desired data rate. In FIG. 5, an MPO interface is used as the optical interface for the transceiver. In practice, other types of optical interfaces can also be used. For example, instead of multiple fibers, the optical transceiver can also interface with a single multi-mode fiber or multi-core fiber that supports multiple spatial channels.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

What is claimed is:

1. An optical transmitter based on silicon photonics, comprising:
 a plurality of optical channels; and
 an active multiplexer comprising a wavelength multiplexer and a semiconductor optical amplifier (SOA) coupled to the optical channels, wherein the wavelength multiplexer and the SOA are integrated onto a chip separate from the plurality of optical channels, and wherein the SOA is configured to amplify to-be-transmitted optical signals from one or more optical channels.

2. The optical transmitter of claim 1, wherein the plurality of optical channels comprises a number of wavelength channels.

3. The optical transmitter of claim 2, wherein the wavelength multiplexer is configured to combine optical signals from the plurality of wavelength channels and send the combined optical signals to an SOA for amplification, thereby facilitating the optical transmitter to meet an optical power budget requirement of a high-speed optical link.

4. The optical transmitter of claim 1, wherein the wavelength multiplexer and the SOA are integrated onto an InP-based optical chip separate from the plurality of optical channels.

5. The optical transmitter of claim 1, wherein the plurality of optical channels comprises a number of spatial channels.

6. The optical transmitter of claim 5, wherein a respective spatial channel comprises a modulator configured to modulate a continuous wave optical signal and to send the modulated optical signal to a second SOA for amplification, thereby facilitating the optical transmitter to meet an optical power budget requirement of a high-speed optical link.

7. The optical transmitter of claim 6, wherein the modulator and the second SOA are packaged together to form a system-in-a-package (SiP).

8. The optical transmitter of claim 1, comprising at least four optical channels with each optical channel operating at a data rate of at least 200 Gbps.

9. The optical transmitter of claim 1, wherein the optical transmitter is part of an optical transceiver that conforms to a standard form factor.

10. The optical transmitter of claim 1, wherein each optical channel comprises a plurality of electrical and optical components, and wherein one or more electrical and optical components are integrated onto a Si-based substrate using a silicon photonics technology.

11. An optical receiver based on silicon photonics, comprising:
 a plurality of optical channels; and
 an active demultiplexer comprising a wavelength demultiplexer and a semiconductor optical amplifier (SOA) coupled to the optical channels, wherein the wavelength demultiplexer and the SOA are integrated onto a chip separate from the plurality of optical channels, and wherein the SOA is configured to amplify optical signals received by one or more optical channels.

12. The optical receiver of claim 11, wherein the plurality of optical channels comprises a number of wavelength channels.

13. The optical receiver of claim 12, wherein the SOA is configured to amplify the optical signals before sending the optical signals to the wavelength demultiplexer, thereby increasing a sensitivity of the optical receiver.

14. The optical receiver of claim 11, wherein the wavelength demultiplexer and the SOA are integrated onto an InP-based optical chip separate from the plurality of optical channels.

15. The optical receiver of claim 11, wherein the plurality of optical channels comprises a number of spatial channels.

16. The optical receiver of claim 15, wherein a respective spatial channel comprises a photo detector configured to convert optical signals received by the spatial channel to electrical signals, wherein the photo detector is coupled to a second SOA, and wherein the second SOA is configured to amplify the optical signals received by the spatial channel before sending the optical signals to the photo detector, thereby increasing a sensitivity of the optical receiver.

17. The optical receiver of claim 16, wherein the photo detector and the SOA are integrated onto an InP-based optical chip separate from the plurality of optical channels.

18. The optical receiver of claim 11, wherein the optical receiver is part of an optical transceiver that conforms to a standard form factor.

19. The optical receiver of claim 11, wherein each optical channel comprises a plurality of electrical and optical components, and wherein one or more electrical and optical components are integrated onto a Si-based substrate using a silicon photonics technology.

20. An optical transceiver based on silicon photonics, comprising:

an optical transmitter; and an optical receiver;

wherein the optical transmitter or the optical receiver comprises an active multiplexer or an active demultiplexer, respectively;

wherein the active multiplexer comprises a wavelength multiplexer and a semiconductor optical amplifier (SOA) integrated onto a chip separate from silicon photonics components within the optical transmitter;

wherein the active demultiplexer comprises a wavelength demultiplexer and a semiconductor optical amplifier (SOA) integrated onto a chip separate from silicon photonics components within the optical receiver; and wherein the SOA is configured to amplify optical signals to be transmitted by the optical transmitter or optical signals received by the optical receiver, respectively, thereby facilitating the optical transceiver to meet an optical power budget requirement of a high-speed optical link.

* * * * *